United States Patent
Hou et al.

(10) Patent No.: US 12,475,909 B2
(45) Date of Patent: Nov. 18, 2025

(54) METHOD AND APPARATUS FOR PROCESSING SPEECH, ELECTRONIC DEVICE AND STORAGE MEDIUM

(71) Applicant: BEIJING BAIDU NETCOM SCIENCE TECHNOLOGY CO., LTD., Beijing (CN)

(72) Inventors: Jiankang Hou, Beijing (CN); Tao Sun, Beijing (CN); Zhipeng Nie, Beijing (CN); Liqiang Zhang, Beijing (CN); Lei Jia, Beijing (CN); Haifeng Wang, Beijing (CN)

(73) Assignee: BEIJING BAIDU NETCOM SCIENCE TECHNOLOGY CO., LTD., Beijing (CN)

( * ) Notice: Subject to any disclaimer, the term of this patent is extended or adjusted under 35 U.S.C. 154(b) by 251 days.

(21) Appl. No.: 17/933,152

(22) Filed: Sep. 19, 2022

(65) Prior Publication Data
US 2023/0015112 A1    Jan. 19, 2023

(30) Foreign Application Priority Data

Sep. 27, 2021 (CN) .......................... 202111138464.5

(51) Int. Cl.
*G10L 21/10* (2013.01)
*G10L 13/02* (2013.01)
(Continued)

(52) U.S. Cl.
CPC .............. *G10L 21/10* (2013.01); *G10L 13/02* (2013.01); *G10L 21/0208* (2013.01); *G10L 25/51* (2013.01)

(58) Field of Classification Search
CPC . G10L 21/013; G10L 21/0232; G10L 21/003; G10L 21/007; G10L 21/0272;
(Continued)

(56) References Cited

U.S. PATENT DOCUMENTS

| 2004/0030546 A1* | 2/2004 | Sato ........................ G10L 21/04 704/207 |
| 2021/0366461 A1 | 11/2021 | Ahmed et al. |
| 2023/0215420 A1* | 7/2023 | Yu ........................... G10L 25/30 704/259 |

FOREIGN PATENT DOCUMENTS

| CN | 111414005 A | 7/2020 |
| CN | 111833843 A | 10/2020 |

(Continued)

OTHER PUBLICATIONS

Office Action issue for corresponding Chinese patent application No. 202111138464.5 issued Jul. 15, 2022 (12 pages).
(Continued)

*Primary Examiner* — Leshui Zhang
(74) *Attorney, Agent, or Firm* — Osha Bergman Watanabe & Burton LLP

(57) ABSTRACT

A method for processing a speech includes: acquiring an original speech; extracting a spectrogram from the original speech; acquiring a speech synthesis model, where the speech synthesis model comprises a first generation sub-model and a second generation sub-model; generating a harmonic structure of the spectrogram, by invoking the first generation sub-model to process the spectrogram; and generating a target speech, by invoking the second generation sub-model to process the harmonic structure and the spectrogram.

12 Claims, 4 Drawing Sheets

--- generating a plurality of sub-band speeches based on the harmonic structure and the spectrogram — 301 generating a target speech by synthesizing the plurality of sub-band speeches — 302

(51) Int. Cl.
*G10L 21/0208* (2013.01)
*G10L 25/51* (2013.01)

(58) Field of Classification Search
CPC ..... G10L 21/10; G10L 21/0208; G10L 13/02; G10L 13/08; G10L 13/033; G10L 13/027; G10L 13/10; G10L 13/047; G10L 13/04; G10L 15/02; G10L 15/063; G10L 15/16; G10L 15/20; G10L 25/51; G10L 25/18; G10L 19/04; G10L 13/00; G10L 13/06; G10L 2013/021; G10L 15/24; G10L 15/25; G10L 17/02; G10L 19/00; G10L 19/02; G10L 19/0204; G10L 19/0212; G10L 19/0208; G10L 19/0216; G10L 19/022; G10L 19/025; G10L 19/028; G10L 19/03; G10L 19/26; G10L 19/265; G10L 21/00; G10L 21/01; G10L 2021/0135; G10L 21/02; G10L 2021/02082; G10L 2021/02085; G10L 2021/02087; G10L 21/0216; G10L 2021/02161; G10L 2021/02168; G10L 21/0224; G10L 21/0308; G10L 21/0316; G10L 21/0332; G10L 21/034; G10L 21/0364; G10L 2021/03643; G10L 2021/03646; G10L 21/0388; G10L 21/038; G10L 25/24; G10L 25/30; G10L 25/39; G10L 25/45; G06N 3/08; G06N 3/084; G06F 40/58
USPC ....... 704/200, 220, 231, 232, 233, 235, 258, 704/259, 261, 264, 262, 266, 267, 268, 704/270.1, 272, 277, 278, 500–504; 381/312, 316, 320, 321, 97, 98, 99, 100, 381/101, 102, 103, 119
See application file for complete search history.

(56) References Cited

FOREIGN PATENT DOCUMENTS

| CN | 113066472 A | 7/2021 | |
|---|---|---|---|
| CN | 111833843 B * | 5/2022 | ............ G10L 13/02 |
| EP | 1505570 A1 | 2/2005 | |
| JP | 2007114355 A | 5/2007 | |
| JP | 2017182099 A | 10/2017 | |
| KR | 20200092501 A | 8/2020 | |
| WO | 2019138871 A1 | 7/2019 | |
| WO | 2021006117 A1 | 1/2021 | |

OTHER PUBLICATIONS

Ryuichi Yamamoto et al., "Parallel Waveform Based Synthesis or Adversarial Generative with Networks Voicing-Aware Conditional Discriminators," Line Corp, Tokyo, Japan; Apr. 26, 2021 (5 pages).

Xin Wang, et al. "Neural Source-filter-based Waveform Model for Parametric Statistical Speech Synthesis," National Institute of Infomatics, Japan; Apr. 27, 2019 (11 pages).

Office Action issued for Korean patent application No. 10-2022-0109743, mailed Sep. 11, 2023 (14 pages).

Office Action issued for Japanese patent application No. 2022-110128, mailed Jul. 4, 2023 (9 pages).

Lauri Juvela, et al., "GELP GAN-Excited Linear Prediction for Speech Synthesis from Mel-spectrogram;" Aalto University, Finland; Jun. 26, 2019 (5 pages).

Takuma Okamoto, et al., "An Investigation of Subband Wavenet Vocoder Covering Entire Audible Frequency Range With Limited Acoustic Features;" National Institute of Information and Communications Technology, Japan; 2018 (5 pages).

* cited by examiner

METHOD AND APPARATUS FOR PROCESSING SPEECH, ELECTRONIC DEVICE AND STORAGE MEDIUM

CROSS-REFERENCE TO RELATED APPLICATION

This application is based upon and claims priority to Chinese Patent Application No. 202111138464.5, filed on Sep. 27, 2021, the entire contents of which are incorporated herein by reference.

TECHNICAL FIELD

The present disclosure relates to a field of computer technologies, specifically to a field of artificial intelligence (AI) technologies such as a speech technology and a deep learning (DL) technology, particularly to a method and an apparatus for processing a speech, an electronic device and a storage medium.

BACKGROUND

A vocoder technology refers to a technology that converts acoustic features into speech signals. The vocoder, as an important part in a speech synthesis link, directly determines the stability, sound quality and expressiveness of a synthetic audio.

SUMMARY

According to first aspect of the present disclosure, a method for processing a speech is provided. The method is performed by an electronic device. The method includes: acquiring an original speech; extracting a spectrogram from the original speech; acquiring a speech synthesis model, in which the speech synthesis model includes a first generation sub-model and a second generation sub-model; generating a harmonic structure of the spectrogram, by invoking the first generation sub-model to process the spectrogram; and generating a target speech, by invoking the second generation sub-model to process the harmonic structure and the spectrogram.

According to another aspect of the present disclosure, an electronic device is provided. The electronic device includes: at least one processor; and a memory communicatively connected to the at least one processor and stored with instructions executable by the at least one processor, when the instructions are executed by the at least one processor, the at least one processor is caused to: acquire an original speech; extract a spectrogram from the original speech; acquire a speech synthesis model, in which the speech synthesis model includes a first generation sub-model and a second generation sub-model; generate a harmonic structure of the spectrogram, by invoking the first generation sub-model to process the spectrogram; and generate a target speech, by invoking the second generation sub-model to process the harmonic structure and the spectrogram.

According to another aspect of the present disclosure, a non-transitory computer-readable storage medium storing computer instructions is provided, the computer instructions are configured to perform a method for processing a speech. The method includes: acquiring an original speech; extracting a spectrogram from the original speech; acquiring a speech synthesis model, in which the speech synthesis model includes a first generation sub-model and a second generation sub-model; generating a harmonic structure of the spectrogram, by invoking the first generation sub-model to process the spectrogram; and generating a target speech, by invoking the second generation sub-model to process the harmonic structure and the spectrogram.

It should be understood that, the content described in the part is not intended to identify key or important features of embodiments of the present disclosure, nor intended to limit the scope of the present disclosure. Other features of the present disclosure will be easy to understand through the following specification.

BRIEF DESCRIPTION OF THE DRAWINGS

The drawings are intended to better understand the solution, and do not constitute a limitation to the disclosure.

DETAILED DESCRIPTION

Figure 1:
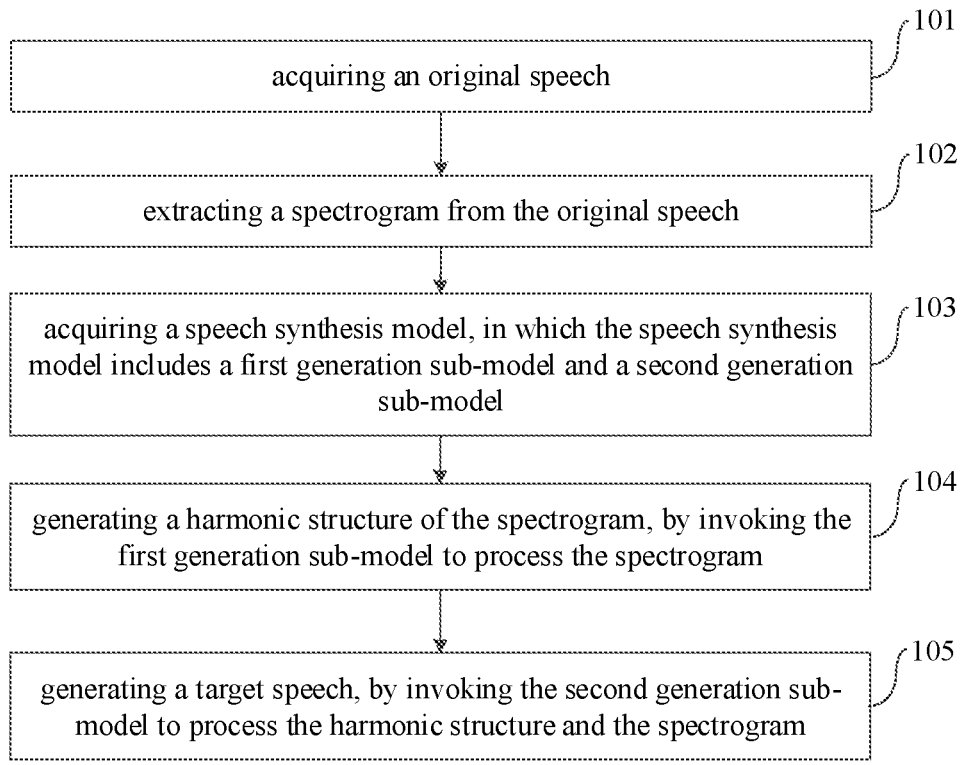
FIG. 1 is a flowchart illustrating a method for processing a speech according to the embodiment of the present disclosure.

The exemplary embodiments of the present disclosure are described as below with reference to the accompanying drawings, which include various details of embodiments of the present disclosure to facilitate understanding, and should be considered as merely exemplary. Therefore, those skilled in the art should realize that various changes and modifications may be made to the embodiments described herein without departing from the scope and spirit of the present disclosure. Similarly, for clarity and conciseness, descriptions of well-known functions and structures are omitted in the following descriptions.

A method and an apparatus for processing a speech, an electronic device and a storage medium are described referring to figures in embodiments of the present disclosure.

Artificial intelligence (AI) is a subject that simulates certain thinking processes and intelligent behaviors (such as learning, reasoning, thinking, planning, etc.) of human beings by using a computer, which covers hardware-level technologies and software-level technologies. The AI hardware technologies generally include technologies such as sensors, dedicated AI chips, cloud computing, distributed storage, big data processing, etc. The AI software technologies include computer vision technology, speech recognition technology, natural language processing (NLP) technology, and several major directions such as deep learning (DL), big data processing technology, knowledge graph technology, etc.

Key technologies of a speech technology in the field of computer refers to an automatic speech recognition ("ASR") technology and a text to speech ("TTS") technology in key technologies. It is a development direction of human-computer interaction in the future to make a computer listen, see, speak and feel. Speech has become the most promising way of human-computer interaction in the future, and speech has more advantages than other interaction methods. The earliest speech technology was initiated by an "Automatic Telephone Translation" program, and includes three very important technologies: speech recognition, natural language understanding and speech synthesis. The research work of speech recognition may be traced back to an Audry system of an AT & T Bell Lab in the 1950s. Since then, researchers have gradually broken through three obstacles of large vocabulary, continuous speech and a non-specific person; the speech synthesis technology is used to make the computer speak, and its core technology is a Text to Speech technology. Speech synthesis has even been applied to an information system of a vehicle, with which a text file, an email, network news or a novel downloaded by an owner to a system computer may be converted into a speech, so that the owner listens the speech in the vehicle.

Deep learning (DL) is a new research direction in the field of machine learning. DL learns inherent law and representation hierarchy of sample data, and information obtained in the learning process is of great help in interpretation of data such as words, images and sound. Its final goal is that the machine may have analytic learning ability like humans, which may recognize data such as words, images, sound, etc. DL is a complicated machine learning algorithm, which has far outperformed the related art in speech and image recognition.

With the development of a speech synthesis technology, a variety of vocoder technologies have been formed. Especially in recent years, with the gradual maturity of deep learning technology, neural vocoders with a good synthesis quality have emerged. These vocoders may be divided into traditional vocoders and neural network vocoders based on whether the deep learning technology is used. The vocoders without the deep learning technology are collectively referred to as traditional vocoders. The vocoders with the deep learning technology are referred to as neural network vocoders.

The method for processing a speech in the embodiment of the present disclosure may be executed by an electronic device. The electronic device may be a personal computer (PC), a tablet computer, a handheld computer, a mobile phone or a server, which will not be limited here.

In the embodiment of the present disclosure, a processing component, a memory component and a drive component may be configured in the electronic device. In at least an embodiment, the drive component and the processing component may be configured in an integrated manner, the memory component may store an operating system, an application program or other program modules, and the processing component may implement a method for processing a speech in the embodiment of the present disclosure by executing an application program stored in the memory component.

FIG. 1 is a flowchart illustrating a method for processing a speech according to the embodiment of the present disclosure.

The method for processing a speech in the embodiment of the disclosure further may be executed by an apparatus for processing a speech in the embodiment of the disclosure, and the apparatus may be configured in the electronic device, to extract a spectrogram from the acquired original speech, and generate a harmonic structure of the spectrogram by invoking the second generation sub-model to process the spectrogram, and generate a target speech by invoking the second generation sub-model to process the harmonic structure and the spectrogram, so that the target speech is characterized by good synthetic sound quality, high timbre restoration, stable pronunciation and small calculation amount.

As a possible implementation, the method for processing a speech in embodiments of the present disclosure may be executed on a server side, and the server may execute the method for processing a speech on the cloud as a cloud server.

The method for processing a speech in the embodiment of the present disclosure may be applied to some applications (APPs) that require speech broadcast (for example, map navigation speech, Internet of Vehicles speech interaction, dictionary pen broadcast, etc.), and the APPs may be installed on an electronic device such as a PC computer, a tablet computer, a handheld computer, and a mobile phone.

As illustrated in FIG. 1, the method for processing a speech may include the following steps at 101-105.

At 101, an original speech is acquired. The plurality of original speeches may be acquired, and the original speeches may be speeches expressed in various languages, for example, may include a Chinese speech, an English speech, a Russian speech, a Malay speech, a Chinese and English mixed speech, which is not limited herein. The original speech may be a sentence, a paragraph or a chapter, for example, a news release.

In the embodiment of the present disclosure, the original speech may include speech information input by a user through speech recognition, audio information (speech information) such as movies, music, television shows, etc. downloaded by the user from the network, and speech information acquired by the user from a speech providing device. The speech providing device may include an MP3 (a player capable of playing a music file), an audio/video disc player, a server, a mobile terminal, a smart hard disk, and the like. It is not limited herein.

It needs to be noted that, the user may input speech information acquired by the user into a storage space of an electronic device for storage, for the convenience of subsequent use. The storage space is not limited to a storage space based on an entity, for example, a hard disk, and further may be a storage space (a cloud storage space) of the network hard disk connected to the electronic device.

Specifically, the electronic device (for example, a phone) may acquire an original speech from its own storage space, or acquire an original speech by recording with its own speech function, or acquire an original speech from a speech providing device.

At 102, a spectrogram is extracted from the original speech. The spectrogram may be a Mel spectrogram.

In the embodiment of the disclosure, the spectrogram may be extracted from the original speech based on a preset extraction algorithm. The preset extraction algorithm may be calibrated according to the actual situation.

Specifically, the electronic device may extract the spectrogram from the original speech based on the preset extraction algorithm, after acquiring the original speech.

As a possible implementation, the original speech may be further processed based on an extraction model, to extract a spectrogram from the original speech. It needs to be noted that, the extraction model described in the embodiment may be trained in advance, and pre-stored in the storage space of the electronic device for the convenience of calling applications.

Training and generation of the extraction model may be executed by a relevant training server. The training server may be a cloud server, and also may be a host of a computer. A communication connection may be established between the training server and an electronic device in the method for processing a speech according to the embodiment of the disclosure, and the communication connection may be at least one of wireless network connection and wired network connection. The training server may send a trained extraction model to the electronic device, so that the electronic device may call the trained extraction model when necessary, thus greatly reducing a computing pressure of the electronic device.

Specifically, when the original speech is extracted, the electronic device may first call the extraction model from its own storage space, and then input the original speech to the extraction model, thus extracting a spectrogram from the original speech through the extraction model, to obtain a spectrogram output by the extraction model.

As another possible implementation, the electronic device further may extract a spectrogram from the original speech using an extraction tool (for example, a plug-in).

At 103, a speech synthesis model is acquired, where the speech synthesis model includes a first generation sub-model and a second generation sub-model.

In the embodiment of the disclosure, the speech synthesis model may be a vocoder.

It needs to be noted that, the speech synthesis model described in the embodiment may be trained in advance, and pre-stored in the storage space of the electronic device for the convenience of calling applications. The speech synthesis model may be a pure convolution structure, which may accelerate the training and prediction speed of the network to a certain extent.

At 104, a harmonic structure of the spectrogram is generated, by invoking a first generation sub-model to the spectrogram.

It needs to be noted that, the harmonic structure of the spectrogram in the embodiment may include periodic signals.

At 105, a target speech is generated, by invoking a second generation sub-model to process the harmonic structure and the spectrogram.

Specifically, when the spectrogram is extracted from the original speech, an electronic device may first call (acquire) the speech synthesis model from its own storage space, input the spectrogram to the speech synthesis model, and process the spectrogram through the speech synthesis model, thus generating a target speech. When the speech synthesis model receives the spectrogram, the speech synthesis model may first process the spectrogram through the built-in first generation sub-model to obtain a harmonic structure of the spectrogram output by the first generation sub-model, and then process the harmonic structure and the spectrogram through the built-in second generation sub-model to obtain a target speech output by the second generation sub-model, that is, a target speech output by the speech synthesis model. Therefore, the target speech with sound quality and timbre closer to the original speech may be generated without shaking and mute sounds.

In the embodiment of the disclosure, the original speech is acquired first, and the spectrogram is extracted from the original speech, and the speech synthesis model is acquired, where the speech synthesis model includes the first generation sub-model and the second generation sub-model, and the harmonic structure of the spectrogram is generated, by invoking the first generation sub-model to the spectrogram, and the target speech is generated, by invoking the second generation sub-model to process the harmonic structure and spectrogram. Therefore, the method is characterized by good synthetic sound quality, high timbre restoration, stable pronunciation and small calculation amount.

Figure 2:
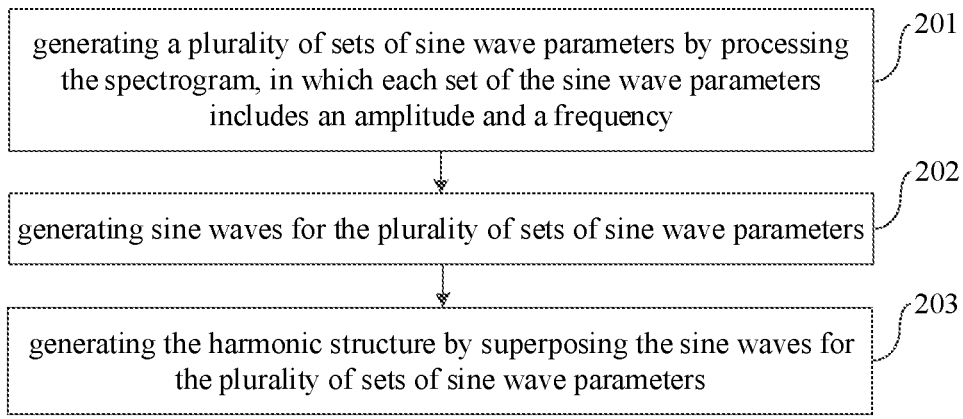
FIG. 2 is a flowchart illustrating another method for processing a speech according to the embodiment of the present disclosure.

In order to clarify the above embodiment, in an embodiment of the present disclosure, as illustrated in FIG. 2, generating the harmonic structure of the spectrogram, by invoking the first generation sub-model to the spectrogram may include the following steps at 201-203.

At 201, a plurality of sets of sine wave parameters are generated by processing the spectrogram, in which each set of the sine wave parameters includes an amplitude and a frequency. It should be noted that, a harmonic relationship may be constituted for each of the plurality of sets of sine wave parameters in the embodiment.

In the embodiment of the disclosure, the first generation sub-model may include a first pure convolutional network consisting of an upsampled convolution network and a residual network.

At 202, sine waves for the plurality of sets of sine wave parameters are generated.

In the embodiment of the disclosure, the sine waves for the plurality of sets of sine wave parameters may be generated based on a sine wave generation strategy, in which the sine wave generation strategy may be calibrated according to the actual situation.

As a possible implementation, the sine waves for the plurality of sets of sine wave parameters may also be generated based on a sine wave generation model. Each of the plurality of sets of sine wave parameters may be input into the sine wave generation model, so that an amplitude and a frequency in each set of sine wave parameters may be processed by the sine wave generation model, to generate sine waves for the plurality of sets of sine wave parameters.

At 203, a harmonic structure is generated by superposing the sine waves for the plurality of sets of sine wave parameters.

Specifically, the first generation sub-model may generate (predict) a plurality of sets of sine wave parameters by processing the spectrogram through the built-in first pure convolutional network after receiving the above spectrogram, generate the sine waves for the plurality of sine wave parameters based on the amplitude and the frequency in each set of sine wave parameters, and generate the harmonic structure by superposing the sine waves for the plurality of sine wave parameters.

Further, the first generation sub-model inputs the harmonic structure as conditional information into the above second generation sub-model through the built-in first pure convolutional network, to guide a generation process of the second generation sub-model.

Thus, a clear harmonic structure close to the original audio may be obtained by the first pure convolution network with a very small calculation amount. The harmonic structure also may be configured as one strong piece of conditional information to guide learning of the second generation sub-model, which greatly reduces the difficulty of modeling the second generation sub-model. In addition, the generation process of guiding the second generation sub-model through the harmonic structure may make the generated target speech have excellent characteristics such as good sound quality, high timbre restoration, stable pronunciation and small calculation amount.

Figure 3:
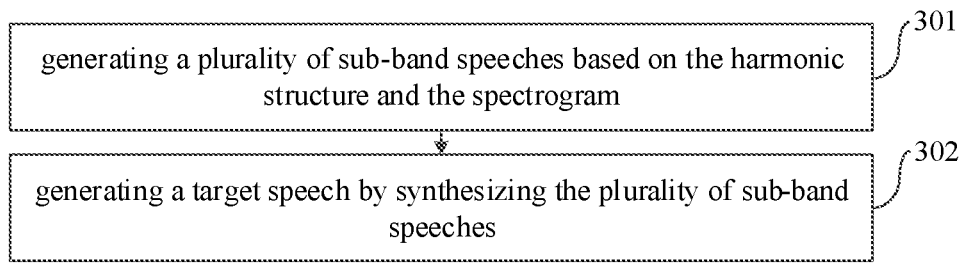
FIG. 3 is a flowchart illustrating another method for processing a speech according to the embodiment of the present disclosure.

Further, in an embodiment of the disclosure, as illustrated in FIG. 3, generating the target speech, by invoking a second generation sub-model to process the harmonic structure and the spectrogram may include the following steps at 301-302.

At 301, a plurality of sub-band speeches are generated based on the harmonic structure and the spectrogram.

In the embodiment of the disclosure, the second generation sub-model may include a second pure convolutional network and a multi-sub-band synthesizer, in which the second pure convolutional network may consist of an upsampled convolution network and a residual network.

At 302, the target speech is generated by synthesizing the plurality of sub-band speeches.

Specifically, when receiving the above spectrum and the harmonic structure, the second generation sub-model may first upsample a sub-band speech length for the spectrogram based on the harmonic structure through the built-in second pure convolution network, and residual processing is performed on the upsampling result based on the harmonic structure, to obtain a plurality of sub-band speeches. The second pure convolution network may upsample the sub-band speech length for the spectrogram using a transposed convolution algorithm, and perform a plurality of residual processes on the upsampling result by using a deep separable convolution algorithm and a one-dimensional convolution algorithm. Then, the second generation sub-model may generate the target speech by synthesizing a plurality of sub-band speeches through the built-in multi-sub-band synthesizer. The transposed convolution algorithm, the deep separable convolution algorithm and the one-dimensional convolution algorithm may be calibrated according to the actual situation.

Therefore, conditional information of the harmonic structure is added when the target speech is generated, which may greatly reduce a calculation amount of the second generation sub-model and ensure the pronunciation stability of the generated audio, so that the speech synthesis model is characterized by good synthesis sound quality, high timbre restoration, stable pronunciation and small calculation amount, and applicable to a scene at any end side.

Figure 4:
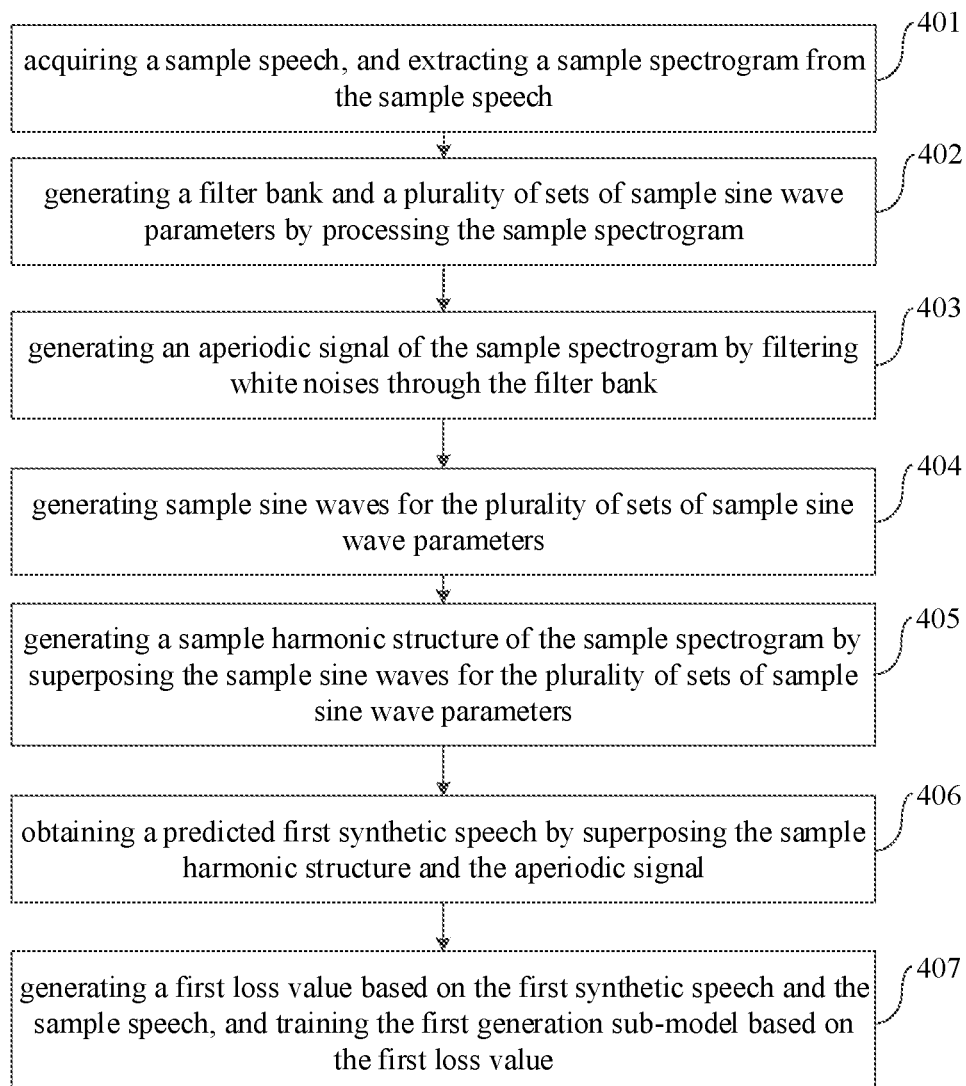
FIG. 4 is a flowchart illustrating another method for processing a speech according to the embodiment of the present disclosure.

In an embodiment of the present disclosure, as illustrated in FIG. 4, the first generation sub-model is generated by the following steps at 401-407.

At 401, a sample speech is acquired, and a sample spectrogram is extracted from the sample speech. The multiple sample speeches may be acquired, and, the sample speeches may include a Chinese speech, an English speech or a German speech, which is not limited herein.

In the embodiment of the disclosure, there are a plurality of paths for acquiring the sample speech. For example, the sample speech may be acquired by collecting a speech of a simultaneous interpretation device during simultaneous interpretation. The sample speech may be created manually, for example, the sample speech is recorded through a related recording device based on the requirements of a related personnel. The sample speech may be acquired by actively collecting speeches of some passers-by. The sample speech may also be acquired from a speech providing device, which is not limited herein.

Specifically, when the sample speech is acquired, the sample spectrogram may be extracted from the sample speech based on the above preset extraction algorithm.

At 402, a filter bank and a plurality of sets of sample sine wave parameters are generated by processing the sample spectrogram.

It needs to be noted that, the filter bank described in the embodiment may include a filter bank with a set of aperiodic signals.

At 403, an aperiodic signal of the sample spectrogram is generated by filtering white noise through the filter bank. It needs to be noted that, the white noise described in the embodiment may be pre-stored in the storage space of the electronic device for the convenience of calling applications, or directly generated by a white noise generator.

In the embodiment of the present disclosure, the aperiodic signal may be acquired by a period of white noise, and the periodic signal may be acquired through superposition of a series of sine waves. In a period of periodic signal, a fundamental wave signal and a harmonic signal are included. A sine wave component with the same period as the periodic signal is referred to as a fundamental component, a frequency of the fundamental component is referred to as a fundamental frequency, and a sine wave component having a frequency equal to an integer multiple of the fundamental frequency is referred to as a harmonic wave. The fundamental frequency and the harmonic wave are added to obtain a periodic signal, and the periodic signal is the harmonic structure in the foregoing embodiment.

At 404, sample sine waves for a plurality of sets of sample sine wave parameters are generated.

At 405, a sample harmonic structure of the sample spectrogram is generated by superposing the sample sine waves for the plurality of sets of sample sine wave parameters.

Specifically, the first pure convolutional network in the first generation sub-model may first predict a filter bank with a set of aperiodic signals based on the input of the sample spectrogram during training, and filter white noise through the filter bank to obtain the aperiodic signal of the sample spectrogram, and the first pure convolutional network further may predict the plurality of sets of sine wave parameters with a harmonic relationship, and generate the sine waves for the plurality of sets of sine wave parameters with a harmonic relationship. A sample harmonic structure of the sample spectrogram may be obtained by superposing the sample sine waves for the plurality of sets of sample sine wave parameters with a harmonic relationship.

At 406, a predicted first synthetic speech is obtained by superposing the sample harmonic structure and the aperiodic signal.

At 407, a first loss value is generated based on the first synthetic speech and the sample speech, and the first generation sub-model is trained based on the first loss value.

In the embodiment of the disclosure, a difference between the first synthetic speech and the sample speech may be obtained by comparing (discriminating) the first synthetic speech with the sample speech, and the difference may be taken as the first loss value. The discriminator may generate the first loss value by discriminating the first synthetic speech and the sample speech, or generate the first loss value by discriminating the first synthetic speech and the sample speech based on a preset discrimination algorithm, which is not limited herein. The discriminator may be a pure convolutional structure, and the discriminator may be pre-stored in the storage space of the electronic device for the convenience of calling applications. It should be noted that, the preset extraction algorithm described in the embodiment may be calibrated according to the actual situation.

Specifically, when the first pure convolutional network in the first generation sub-model obtains the sample harmonic structure of the sample spectrogram during training, the predicted first synthetic speech may be obtained by superposing the harmonic structure (that is, a periodic signal) and the aperiodic signal, and the difference between the first synthetic speech and the sample speech may be obtained by comparing (discriminating) the first synthetic speech with the sample speech, and the difference may be taken as the first loss value. The first generation sub-model is trained based on the first loss value, and optimized, which improves the generation accuracy.

Figure 5:
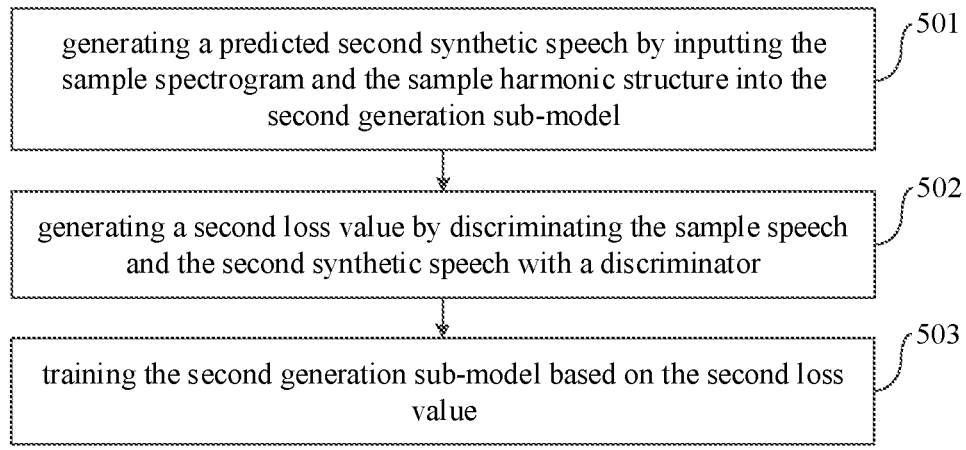
FIG. 5 is a flowchart illustrating another method for processing a speech according to the embodiment of the present disclosure.

In an embodiment of the present disclosure, as illustrated in FIG. 5, the second generation sub-model may be generated by the following steps at 501-503.

At 501, a predicted second synthetic speech is generated by inputting the sample spectrogram and the sample harmonic structure into the second generation sub-model.

Specifically, when the second pure convolutional network in the second generation sub-model receives the above sample harmonic structure during training, a sub-band speech length may be upsampled for the sample spectrogram based on the sample harmonic structure, and residual processing may be performed on the upsampling result based on the sample harmonic structure, to obtain a plurality of sample sub-band speeches. Then, the multi-sub-band synthesizer in the second generation sub-model may obtain the predicted second synthetic speech by synthesizing the plurality of sub-band speeches.

At 502, a second loss value is generated by discriminating the sample speech and the second synthetic speech with a discriminator.

At 503, the second generation sub-model is trained based on the second loss value.

Specifically, the second synthetic speech predicted by the multi-sub-band synthesizer and the above sample speech may be input into the discriminator during training, so that the discriminator discriminates the sample speech and the second synthetic speech, to obtain the second loss value output by the discriminator. The second generation sub-model may be trained and optimized based on the second loss value, which further improves the generation accuracy.

As a possible implementation, the second loss value further may be generated by discriminating the sample speech and the second synthetic speech based on the above preset discrimination algorithm.

In the embodiment of the disclosure, the above speech synthetic model synthesizes a speech with sound quality and timbre closer to the original speech without shaking and mute sounds, and more important, the synthesis real-time rate of the speech synthetic model is comparable to that of the traditional vocoder, and the quality of the synthetic speech is comparable to that of the common neural vocoder.

Figure 6:
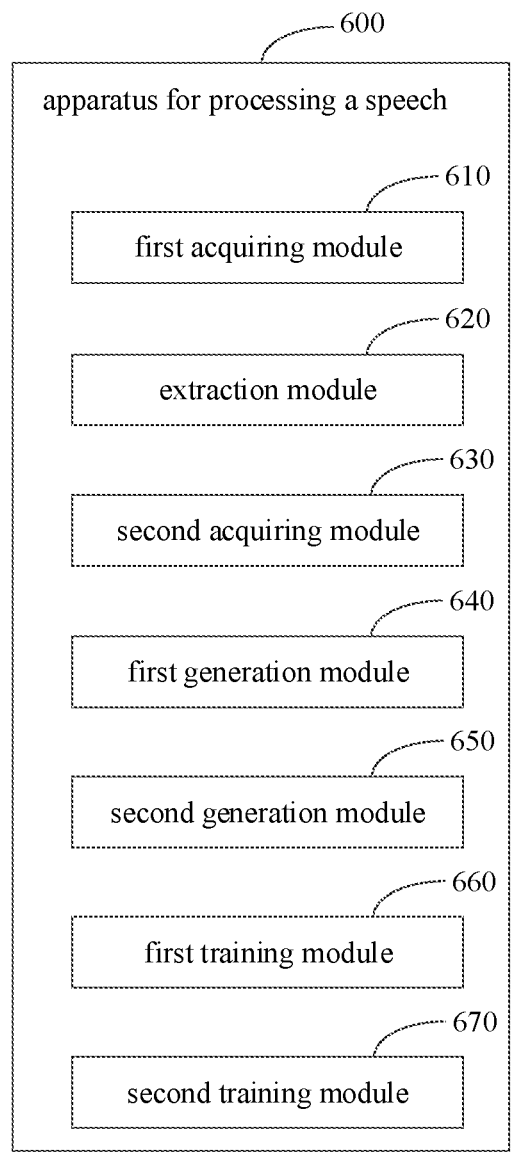
FIG. 6 is a structural diagram illustrating an apparatus for processing a speech according to the embodiment of the present disclosure.

FIG. 6 is a structural diagram illustrating an apparatus for processing a speech according to the embodiment of the present disclosure.

The apparatus for processing a speech in the embodiment of the disclosure may be configured in the electronic device, to extract a spectrogram from the acquired original speech, generate a harmonic structure of the spectrogram by invoking the second generation sub-model to process the spectrogram, and generate a target speech by invoking the second generation sub-model to process the harmonic structure and the spectrogram, so that the target speech is characterized by good synthetic sound quality, high timbre restoration, stable pronunciation and small calculation amount.

The apparatus for processing a speech in the embodiment of the present disclosure may be configured (installed) on some applications (APPs) that require speech broadcast (for example, map navigation speech, Internet of Vehicles speech interaction, dictionary pen broadcast, etc.), and the APPs may be installed on an electronic device such as a PC computer, a tablet computer, a handheld computer, and a mobile phone.

As illustrated in FIG. 6, the apparatus 600 for processing a speech may include a first acquiring module 610, an extraction module 620, a second acquiring module 630, a first generation module 640 and a second generation module 650.

The first acquiring module 610 is configured to acquire an original speech. The plurality of original speeches may be acquired, and the original speeches may be speeches expressed in various languages, for example, may include a Chinese speech, an English speech, a Russian speech, a Malay speech, a Chinese and English mixed speech, which is not limited herein. The original speech may be a sentence, a paragraph or a chapter, for example, a news release.

In the embodiment of the present disclosure, the original speech may include speech information input by a user through speech recognition, audio information (speech information) such as movies, music, television shows, etc. downloaded by the user from a network, and speech information acquired by the user from a speech providing device. The speech providing device may include an MP3, an audio/video disc player, a server, a mobile terminal, a smart hard disk, and the like. It is not limited herein.

It needs to be noted that, the user may input speech information acquired by a user into a storage space of an electronic device for storage for the convenience of subsequent use. The storage space is not limited to a storage space based on an entity, for example, a hard disk, and further may be a storage space (a cloud storage space) of the network hard disk connected to the electronic device.

Specifically, the first acquiring module 610 may acquire an original speech from a storage space of the electronic device, or acquire an original speech by recording with its own speech function, or acquire an original speech from a speech providing device.

The extraction module 620 is configured to extract a spectrogram from the original speech. The spectrogram may be a Mel spectrogram.

In the embodiment of the disclosure, the extraction module 620 may extract a spectrogram from the original speech based on a preset extraction algorithm. The preset extraction algorithm may be calibrated according to the actual situation.

Specifically, when the first acquiring module 610 acquires the original speech, an extraction module 620 may extract the spectrogram from the original speech based on a preset extraction algorithm.

As a possible implementation, the extraction module 620 further may process the original speech based on an extraction model, to extract a spectrogram from the original speech. It needs to be noted that, the extraction model described in the embodiment may be trained in advance, and pre-stored in the storage space of the electronic device for the convenience of calling applications.

Training and generation of the extraction model may be executed by a relevant training server. The training server may be a cloud server, and also may be a host of a compute. A communication connection may be established between the training server and an electronic device configured with an apparatus for processing a speech according to the embodiment of the disclosure, and the communication connection may be at least one of wireless network connection and wired network connection. The training server may send a trained extraction model to the electronic device, so that the electronic device may call the trained extraction model when necessary, thus greatly reducing a computing pressure of the electronic device.

Specifically, when the first acquiring module 620 acquires the original speech, the extraction module 620 may call the extraction model from the storage space of the electronic device, and then input the original speech to the extraction model, thus extracting the spectrogram from the original speech through the extraction model, to obtain the spectrogram output by the extraction model.

As another possible implementation, the extraction module 620 further may extract a spectrogram from the original speech by using an extraction tool (for example, a plug-in).

The second acquiring module 630 is configured to acquire a speech synthesis model, the speech synthesis model includes a first generation sub-model and a second generation sub-model.

In the embodiment of the disclosure, the speech synthesis model may be a vocoder.

It needs to be noted that, the speech synthesis model described in the embodiment may be trained in advance, and pre-stored in the storage space of the electronic device for the convenience of calling applications. The speech synthesis model may be a pure convolution structure, which may accelerate the training and prediction speed of the network to a certain extent.

The first generation module 640 is configured to generate a harmonic structure of the spectrogram, by invoking the first generation sub-model to the spectrogram.

It needs to be noted that, the harmonic structure of the spectrogram in the embodiment may include periodic signals.

The second generation module 650 is configured to generate a target speech, by invoking the second generation sub-model to the harmonic structure and the spectrogram.

In the embodiment of the disclosure, the first acquiring module acquires the original speech first, and the extraction module extracts the spectrogram from the original speech, and the second acquiring module acquires the speech synthesis model, in which the speech synthesis model includes the first generation sub-model and the second generation sub-model, and the first generation module generates the harmonic structure of the spectrogram, by invoking first generation sub-model to the spectrogram, and the second generation module generates the target speech, by invoking the second generation sub-model to process the harmonic structure and the spectrogram. Therefore, the apparatus is characterized by good synthetic sound quality, high timbre restoration, stable pronunciation and small calculation amount.

In an embodiment of the disclosure, the first generation module 640 is specifically configured to: generate a plurality of sets of sine wave parameters by processing the spectrogram, in which each set of the sine wave parameters includes an amplitude and a frequency; generate sine waves for the plurality of sets of sine wave parameters; and generate a harmonic structure by superposing the sine waves for the plurality of sets of sine wave parameters.

In an embodiment of the disclosure, the second generation module 650 is specifically configured to: generate a plurality of sub-band speeches based on the harmonic structure and the spectrogram; and generate a target speech by synthesizing the plurality of sub-band speeches.

In an embodiment of the disclosure, as illustrated in FIG. 6, the apparatus 600 for processing a speech further may include a first training module 660, and the first training module 660 is configured to generate the first generation sub-model by: acquiring a sample speech, and extracting a sample spectrogram from the sample speech; generating a filter bank and a plurality of sets of sample sine wave parameters by processing the sample spectrogram; generating an aperiodic signal of the sample spectrogram by filtering white noise through the filter bank; and generating sample sine waves for the plurality of sets of sample sine wave parameters; generating a sample harmonic structure of the sample spectrogram by superposing the sample sine waves for the plurality of sets of sample sine wave parameters; obtaining a predicted first synthetic speech by superposing the sample harmonic structure and the aperiodic signal; and generating a first loss value based on the first synthetic speech and the sample speech, and training the first generation sub-model based on the first loss value.

In an embodiment of the disclosure, as illustrated in FIG. 6, the apparatus 600 for processing a speech further may include a second training module 670, the second training module 670 is configured to generate the first generation sub-model by: generating a predicted second synthetic speech by inputting the sample spectrogram and the sample harmonic structure into the second generation sub-model; generating a second loss value by discriminating the sample speech and the second synthetic speech with a discriminator; and training the second generation sub-model based on the second loss value.

It needs to be noted that the foregoing explanation of the embodiment of the method for processing a speech also applies to an apparatus for processing a speech in the embodiment, which will not be repeated here.

In the apparatus for processing a speech in the embodiment of the disclosure, the first acquiring module acquires the original speech first, and the extraction module extracts the spectrogram from the original speech, and the second acquiring module acquires the speech synthesis model, in which the speech synthesis model includes the first generation sub-model and the second generation sub-model, and the first generation module generates the harmonic structure of the spectrogram, by invoking the first generation sub-model to the spectrogram, and the second generation module generates the target speech, by invoking the second generation sub-model to process the harmonic structure and the spectrogram. Therefore, the apparatus is characterized by good synthetic sound quality, high timbre restoration, stable pronunciation and small calculation amount.

In the technical solution of the present disclosure, processes such as acquisition, storage, use, processing, transmission, provision and disclosure of user personal information involved in the present disclosure conform to the provisions of relevant legal regulations, and do not violate the public-order and good custom.

Figure 7:
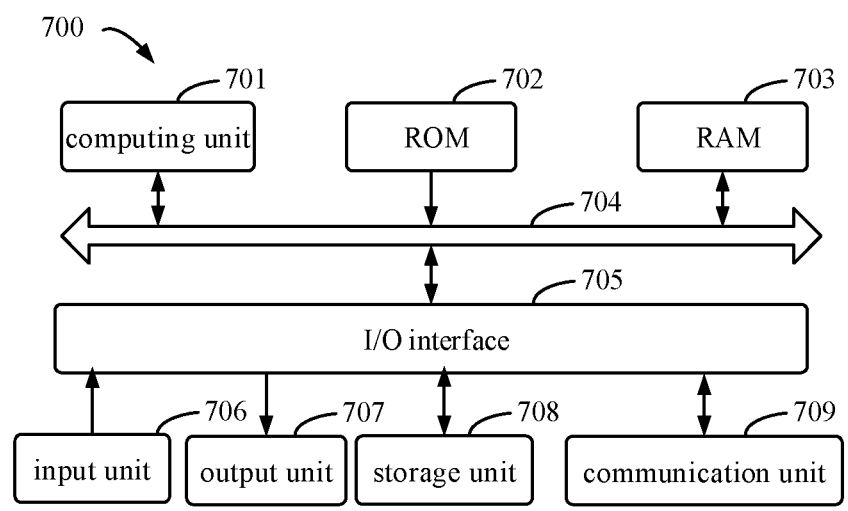
FIG. 7 is a block diagram illustrating an electronic device configured to perform a method for processing a speech in the embodiment of the present disclosure.

In the embodiment of the present disclosure, an electronic device, a readable storage medium and a computer program product are further provided according to embodiments of the present disclosure FIG. 7 is a schematic block diagram illustrating an example electronic device 700 in the embodiment of the present disclosure. The electronic device is intended to represent various types of digital computers, such as laptop computers, desktop computers, workstations, personal digital assistants, servers, blade servers, mainframe computers, and other suitable computers. The electronic device may also represent various types of mobile apparatuses, such as personal digital assistants, cellular phones, smart phones, wearable devices, and other similar computing devices. The components shown herein, their connections and relations, and their functions are merely examples, and are not intended to limit the implementation of the disclosure described and/or required herein.

As illustrated in FIG. 7, a device 700 includes a computing unit 701, configured to execute various appropriate actions and processes according to a computer program stored in a read-only memory (ROM) 702 or loaded from a storage unit 708 to a random access memory (RAM) 703. In the RAM 703, various programs and data required for a device 700 may be stored. The computing unit 701, the ROM 702 and the RAM 703 may be connected with each other by a bus 704. An input/output (I/O) interface 705 is also connected to the bus 704.

A plurality of components in the device 700 are connected to an I/O interface 705, and includes: an input unit 706, for example, a keyboard, a mouse, etc.; an output unit 707, for example various types of displays, speakers; a storage unit 708, for example a magnetic disk, an optical disk; and a communication unit 709, for example, a network card, a modem, a wireless transceiver. The communication unit 709 allows the device 700 to exchange information/data through a computer network such as internet and/or various types of telecommunication networks and other devices.

The computing unit 701 may be various types of general and/or dedicated processing components with processing and computing ability. Some examples of the computing unit 701 include but not limited to a central processing unit (CPU), a graphics processing unit (GPU), various dedicated artificial intelligence (AI) computing chips, various computing units running a machine learning model algorithm, a digital signal processor (DSP), and any appropriate processor, controller, microcontroller, etc. The computing unit 701 executes various methods and processes as described above, for example, a method for processing a speech. For example, in some embodiments, the method for processing a speech may be further implemented as a computer software program, which is physically contained in a machine readable medium, such as a storage unit 708. In some embodiments, a part or all of the computer program may be loaded and/or installed on the device 700 through the ROM 702 and/or the communication unit 709. When the computer program is loaded on the RAM 703 and executed by the computing unit 701, one or more steps in the method for processing a speech as described above may be performed. Alternatively, in other embodiments, the computing unit 701 may be configured to execute a method for processing a speech in other appropriate ways (for example, by virtue of a firmware).

Various implementation modes of systems and technologies described herein may be implemented in a digital electronic circuit system, an integrated circuit system, a field programmable gate array (FPGA), a dedicated application specific integrated circuit (ASIC), a system on a chip (SoC), a load programmable logic device (CPLD), a computer hardware, a firmware, a software, and/or combinations thereof. The various implementation modes may include: being implemented in one or more computer programs, and the one or more computer programs may be executed and/or interpreted on a programmable system including at least one programmable processor, and the programmable processor may be a dedicated or a general-purpose programmable processor that may receive data and instructions from a storage system, at least one input apparatus, and at least one output apparatus, and transmit the data and instructions to the storage system, the at least one input apparatus, and the at least one output apparatus.

A computer code configured to execute a method in the present disclosure may be written with one or any combination of multiple programming languages. These programming languages may be provided to a processor or a controller of a general purpose computer, a dedicated computer, or other apparatuses for programmable data processing so that the function/operation specified in the flowchart and/or block diagram may be performed when the program code is executed by the processor or controller. A computer code may be executed completely or partly on the machine, executed partly on the machine as an independent software package and executed partly or completely on the remote machine or server.

In the context of the present disclosure, a machine-readable medium may be a tangible medium that may contain or store a program intended for use in or in conjunction with an instruction execution system, apparatus, or device. A machine-readable medium may be a machine readable signal medium or a machine readable storage medium. A machine readable storage medium may include but not limited to an electronic, magnetic, optical, electromagnetic, infrared, or semiconductor system, apparatus or device, or any appropriate combination thereof. A more specific example of a machine readable storage medium includes an electronic connector with one or more cables, a portable computer disk, a hardware, a random access memory (RAM), a read-only memory (ROM), an EPROM programmable read-only ROM (an EPROM or a flash memory), an optical fiber device, and a portable optical disk read-only memory (CDROM), an optical storage device, a magnetic storage device, or any appropriate combination of the above.

In order to provide interaction with the user, the systems and technologies described here may be implemented on a computer, and the computer has: a display apparatus for displaying information to the user (for example, a CRT (cathode ray tube) or a LCD (liquid crystal display) monitor); and a keyboard and a pointing apparatus (for example, a mouse or a trackball) through which the user may provide input to the computer. Other types of apparatuses may further be configured to provide interaction with the user; for example, the feedback provided to the user may be any form of sensory feedback (for example, visual feedback, auditory feedback, or tactile feedback); and input from the user may be received in any form (including an acoustic input, a speech input, or a tactile input).

The systems and technologies described herein may be implemented in a computing system including back-end components (for example, as a data server), or a computing system including middleware components (for example, an application server), or a computing system including front-end components (for example, a user computer with a graphical user interface or a web browser through which the user may interact with the implementation mode of the system and technology described herein), or a computing system including any combination of such back-end components, middleware components or front-end components. The system components may be connected to each other through any form or medium of digital data communication (for example, a communication network). Examples of communication networks include: a local area network (LAN), a wide area network (WAN), an internet and a blockchain network.

The computer system may include a client and a server. The client and server are generally far away from each other and generally interact with each other through a communication network. The relation between the client and the server is generated by computer programs that run on the corresponding computer and have a client-server relationship with each other. A server may be a cloud server, also known as a cloud computing server or a cloud host, is a host product in a cloud computing service system, to solve the shortcomings of large management difficulty and weak business expansibility existed in the traditional physical host and Virtual Private Server (VPS) service. A server further may be a server with a distributed system, or a server in combination with a blockchain.

It should be understood that, various forms of procedures shown above may be configured to reorder, add or delete steps. For example, steps described in the present disclosure may be executed in parallel, sequentially, or in a different order, as long as the desired result of the technical solution disclosed in the present disclosure may be achieved, which will not be limited herein.

What is claimed is:

1. A method for processing a speech, performed by an electronic device, the method comprising:
    acquiring an original speech;
    extracting a spectrogram from the original speech;
    acquiring a speech synthesis model, wherein, the speech synthesis model comprises a first generation sub-model and a second generation sub-model;
    generating a harmonic structure of the spectrogram, by invoking the first generation sub-model to process the spectrogram; and
    generating a target speech, by invoking the second generation sub-model to process the harmonic structure and the spectrogram;
    wherein generating the harmonic structure of the spectrogram comprises:
    generating a plurality of sets of sine wave parameters by the first generation sub-model processing the spectrogram, wherein each set of the sine wave parameters is in a harmonic relationship, and comprises an amplitude and a frequency;
    generating sine waves for the plurality of sets of sine wave parameters through the first generation sub-model; and
    generating the harmonic structure by the first generation sub-model superposing the sine waves for the plurality of sets of sine wave parameters,
    wherein generating the target speech comprises:
    upsampling a sub-band speech length for the spectrogram based on the harmonic structure to obtain an upsampling result;
    performing residual processing on the upsampling result through the second generation sub-model based on the harmonic structure to obtain a plurality of sub-band speeches; and
    generating the target speech by synthesizing the plurality of sub-band speeches through the second generation sub-model.

2. The method of claim 1, wherein the first generation sub-model is generated by:
    acquiring a sample speech, and extracting a sample spectrogram from the sample speech;
    generating a filter bank and a plurality of sets of sample sine wave parameters by processing the sample spectrogram;
    generating an aperiodic signal of the sample spectrogram by filtering white noises through the filter bank; and
    generating sample sine waves for the plurality of sets of sample sine wave parameters;
    generating a sample harmonic structure of the sample spectrogram by superposing the sample sine waves for the plurality of sets of sample sine wave parameters;
    obtaining a predicted first synthetic speech by superposing the sample harmonic structure and the aperiodic signal; and
    generating a first loss value based on the first synthetic speech and the sample speech, and training the first generation sub-model based on the first loss value.

3. The method of claim 2, wherein the second generation sub-model is generated by:
    generating a predicted second synthetic speech by inputting the sample spectrogram and the sample harmonic structure into the second generation sub-model;
    generating a second loss value by discriminating the sample speech and the second synthetic speech with a discriminator; and
    training the second generation sub-model based on the second loss value.

4. The method of claim 1, wherein the harmonic structure of the spectrogram includes periodic signals.

5. An electronic device, comprising:
    at least one processor; and
    a memory communicatively connected to the at least one processor and stored with instructions executable by the at least one processor,
    wherein when the instructions are executed by the at least one processor, the at least one processor is caused to:
    acquire an original speech;
    extract a spectrogram from the original speech;
    acquire a speech synthesis model, wherein the speech synthesis model comprises a first generation sub-model and a second generation sub-model;
    generate a harmonic structure of the spectrogram, by invoking the first generation sub-model to process the spectrogram; and
    generate a target speech, by invoking the second generation sub-model to process the harmonic structure and the spectrogram,
    wherein the at least one processor is caused to:
    generate a plurality of sets of sine wave parameters by the first generation sub-model processing the spectrogram, wherein each set of the sine wave parameters is in a harmonic relationship, and comprises an amplitude and a frequency;
    generate sine waves for the plurality of sets of sine wave parameters through the first generation sub-model; and
    generate the harmonic structure by the first generation sub-model superposing the sine waves for the plurality of sets of sine wave parameters,
    wherein the at least one processor is caused to:
    upsample a sub-band speech length for the spectrogram based on the harmonic structure to obtain an upsampling result;
    perform residual processing on the upsampling result through the second generation sub-model based on the harmonic structure to obtain a plurality of sub-band speeches; and
    generate the target speech by synthesizing the plurality of sub-band speeches through the second generation sub-model.

6. The electronic device of claim 5, wherein the at least one processor is caused to:
    acquire a sample speech, and extracting a sample spectrogram from the sample speech;
    generate a filter bank and a plurality of sets of sample sine wave parameters by processing the sample spectrogram;
    generate an aperiodic signal of the sample spectrogram by filtering white noises through the filter bank; and generate sample sine waves for the plurality of sets of sample sine wave parameters;

generate a sample harmonic structure of the sample spectrogram by superposing the sample sine waves for the plurality of sets of sample sine wave parameters;

obtain a predicted first synthetic speech by superposing the sample harmonic structure and the aperiodic signal; and generate a first loss value based on the first synthetic speech and the sample speech, and training the first generation sub-model based on the first loss value.

7. The electronic device of claim 6, wherein the at least one processor is caused to:

generate a predicted second synthetic speech by inputting the sample spectrogram and the sample harmonic structure into the second generation sub-model;

generate a second loss value by discriminating the sample speech and the second synthetic speech with a discriminator; and train the second generation sub-model based on the second loss value.

8. The electronic device of claim 5, wherein the harmonic structure of the spectrogram includes periodic signals.

9. A non-transitory computer-readable storage medium having computer instructions stored thereon, wherein the computer instructions are configured to cause a computer to perform a method for processing a speech, the method comprising:

acquiring an original speech;

extracting a spectrogram from the original speech;

acquiring a speech synthesis model, wherein, the speech synthesis model comprises a first generation sub-model and a second generation sub-model;

generating a harmonic structure of the spectrogram, by invoking the first generation sub-model to process the spectrogram; and generating a target speech, by invoking the second generation sub-model to process the harmonic structure and the spectrogram, wherein generating the harmonic structure of the spectrogram comprises:

generating a plurality of sets of sine wave parameters by the first generation sub-model processing the spectrogram, wherein each set of the sine wave parameters is in a harmonic relationship, and comprises an amplitude and a frequency;

generating sine waves for the plurality of sets of sine wave parameters through the first generation sub-model; and generating the harmonic structure by the first generation sub-model superposing the sine waves for the plurality of sets of sine wave parameters, wherein generating the target speech comprises;

upsampling a sub-band speech length for the spectrogram based on the harmonic structure to obtain an upsampling result;

performing residual processing on the upsampling result through the second generation sub-model based on the harmonic structure to obtain a plurality of sub-band speeches; and generating the target speech by synthesizing the plurality of sub-band speeches through the second generation sub-model.

10. The storage medium of claim 9, wherein the first generation sub-model is generated by:

acquiring a sample speech, and extracting a sample spectrogram from the sample speech;

generating a filter bank and a plurality of sets of sample sine wave parameters by processing the sample spectrogram;

generating an aperiodic signal of the sample spectrogram by filtering white noises through the filter bank; and generating sample sine waves for the plurality of sets of sample sine wave parameters;

generating a sample harmonic structure of the sample spectrogram by superposing the sample sine waves for the plurality of sets of sample sine wave parameters;

obtaining a predicted first synthetic speech by superposing the sample harmonic structure and the aperiodic signal; and generating a first loss value based on the first synthetic speech and the sample speech, and training the first generation sub-model based on the first loss value.

11. The storage medium of claim 10, wherein the second generation sub-model is generated by:

generating a predicted second synthetic speech by inputting the sample spectrogram and the sample harmonic structure into the second generation sub-model;

generating a second loss value by discriminating the sample speech and the second synthetic speech with a discriminator; and training the second generation sub-model based on the second loss value.

12. The non-transitory computer-readable storage medium of claim 9, wherein the harmonic structure of the spectrogram includes periodic signals.

* * * * *